(No Model.)
B. PORTER.
NUT LOCK.
No. 524,864.
Patented Aug. 21, 1894.
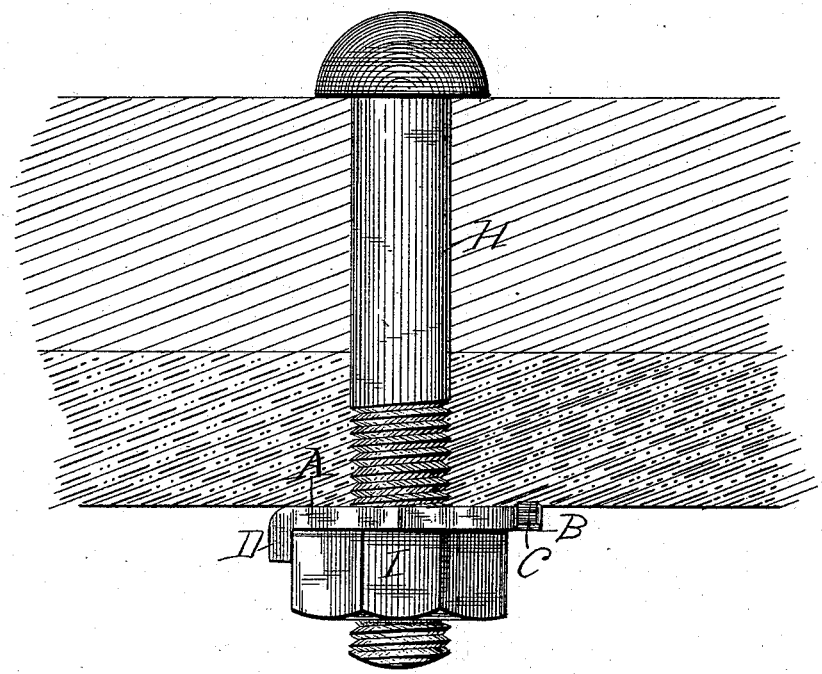
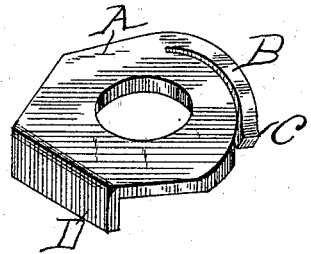
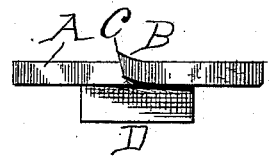
WITNESSES
Benjamin Porter
INVENTOR
By A H Evans & Co
Attorneys

UNITED STATES PATENT OFFICE.

BENJAMIN PORTER, OF FULLERTON, NORTH DAKOTA.

NUT-LOCK.

SPECIFICATION forming part of Letters Patent No. 524,864, dated August 21, 1894.

Application filed May 3, 1893. Serial No. 472,894. (No model.)

*To all whom it may concern:*

Be it known that I, BENJAMIN PORTER, a citizen of the United States, residing at Fullerton, in the county of Dickey and State of North Dakota, have invented certain new and useful Improvements in Nut-Locks, of which the following is a full, clear, and exact description.

My invention relates to improvements in nut locks, and consists in the construction and arrangement of a bolt, washer and nut, by which means the washer holds the nut in such a position that it becomes perfectly locked and renders it impossible to work itself loose in any manner.

Reference is to be had to the accompanying drawings, forming a part of this specification, in which similar letters of reference indicate corresponding parts in all the views.

Figure 1. is a side view of my improved washer applied to the bolt, in use. Fig. 2. represents a perspective view of the washer detached. Fig. 3. is a side view of the washer looking at the spring portion.

In the figures, A represents the washer made of steel, having a hole bored through its center of such size to allow it to fit around the bolt H. At one of the sides of the washer A, projects an arm B which is slightly curved up and sharpened at its outermost end as at C, which forms a spring adapted to bear up against the plain or corrugated surface of one of the pieces which is held together, the opposite side of this washer also extends out a distance from the nut and turned down forming a lip D which fits close against the side of the nut, by which means a complete nut lock is formed.

When the bolt H has been inserted into the material, the washer A is placed thereon. Then the nut I is screwed upon the bolt forcing the end C of the arm B to bear against the material, making it impossible for the washer to move out of its position, and at the same time holding the nut in position by means of the lip D, therefore by forming this completed nut lock it renders it impossible for the nut to work loose accidentally.

It will be noticed that the spring arm B is wholly beyond the periphery of the nut, so that as the nut is screwed on, it will not contact with and render useless the said arm B. Furthermore, the spring arm B, lies wholly beyond the periphery of the washer A so that the washer may be forced against a flat unbroken surface without coming in contact with said arm as it would do if the free end of the arm was bent inwardly beyond the edge of the washer.

Having thus described my invention, what I claim as new, and desire to secure by Letters Patent, is—

A nut lock consisting in a washer provided with the usual bolt aperture, an outwardly projecting lip D at one side of the washer to engage the periphery or edge of the nut, and a spring locking arm or tongue B a greater distance from the bolt hole E, than said lip to prevent it from being engaged by the nut; the said spring tongue or arm lying wholly beyond the edge of the nut to allow the washer to be forced against a flat surface without the nut engaging said tongue or arm; said spring tongue being projected at its free end beyond the body of the washer and terminating in a sharpened or cutting edge to penetrate the surface engaged by it, substantially as herein described.

BENJAMIN PORTER.

Witnesses:
F. H. STURZENACKER,
C. C. MISFELDT.